United States Patent [19]

Dutta et al.

[11] Patent Number: 5,234,710

[45] Date of Patent: Aug. 10, 1993

[54] FLUORESCENT SUNTANNING LAMPS

[75] Inventors: Arunava Dutta, Chestnut Hill; Paul W. Salvi, Andover, both of Mass.

[73] Assignee: GTE Products Corporation, Danvers, Mass.

[21] Appl. No.: 806,680

[22] Filed: Dec. 13, 1991

[51] Int. Cl.⁵ .............................................. B65D 5/06
[52] U.S. Cl. ..................................................... 427/67
[58] Field of Search ........................................ 427/67

[56] References Cited

U.S. PATENT DOCUMENTS

| 4,055,781 | 10/1977 | Schreurs | 427/67 |
| 4,499,403 | 2/1985 | Leppelmeier et al. | 313/487 |

FOREIGN PATENT DOCUMENTS

| 0152152 | 11/1981 | Japan | 427/67 |

*Primary Examiner*—Janyce Bell
*Attorney, Agent, or Firm*—Robert E. Walter

[57] ABSTRACT

A skin tanning fluorescent lamp having a coating of a uniform and homogeneous deflocculated physical mixture of a first and second phosphor where the first phosphor has a desired emission in the spectral region from about 320 to about 400 nanometers and the second phosphor has a desired emission in the spectral region from about 280 to about 320 nanometers, said first phosphor has a first isoelectric point at a first pH and the second phosphor has a second isoelectric point at a second pH. The first and said second pH form a range. The deflocculated coating is stabilized by deflocculating the first and second phosphors at a third pH sufficiently outside of range to produce a resulting coating consistently having desirable emission during production.

15 Claims, 10 Drawing Sheets

FLUORESCENT SUNTANNING LAMPS

BACKGROUND OF THE INVENTION

This invention relates to a low pressure fluorescent mercury vapor discharge lamp having a particular type of phosphor coating to emit skin tanning radiation when excited by the ultraviolet radiation generated from the mercury vapor discharge. More particularly, the present type lamp construction provides satisfactory skin tanning with a preselected amount of radiation in the approximate 280–320 nanometer ultraviolet region of the spectrum. The ultraviolet radiation in this region is referred to as UVB radiation and can produce reddening of the skin from excessive lamp exposure such as can occur from overexposure to natural sunlight. It is also known, as set forth in U.S. Pat. No. 4,499,403 to Leppelmeier et al, that lamps emitting ultraviolet radiation in the approximate wavelengh region 320–400 nanometers can produce skin tanning without skin reddening to any significant degree. However, the American Conference of Governmental Industrial Hygienists has established "threshold limit" values for UVB and UVA emission. Hence, it desirabe to design lamps having emission within certain narrowly prescribed limits and develop production processes which can reliably meet the designed criteria.

SUMMARY OF THE INVENTION

Heretofore, it has been difficult to achieve a consistent coating on suntanning lamps. Certain blends of phosphors had unacceptable coating quality and UVB emission. The lamps suffered from separated coating texture and low values of optical density (OD). A low value of OD is associated with a high value of UVB emission. It is critical that these suntanning lamps produce an appropriate level of UVB emission.

More particularily, it was that a streaky, mud-like coating, referred to as a cracked coating developed about a half hour into the run. The lamps were still completely coated and the glass surface could not be seen. After about one and a half hours, the area occupied by the cracked coating increased. This coating texture is referred to as a feathered coating. Clear spots on the glass could be seen between the feathered areas. In about three hours, almost all of the lamp area displayed feathered coating. Large portions of the lamp surface had no coating. This type of coating texture is referred to as a separated coating.

It is an object of the present invention to provide a lamp and a process for consistently producing a sun tanning lamp which provides the proper amount of UVA and UVB radiation.

These and other objects together with advantages of the present invention will be understood by reference to the following specification and claims.

The present invention, provides a skin tanning fluorescent lamp having a sealed transparent envelope enclosing means to generate a low pressure mercury discharge within said envelope. A coating contained within said envelope comprises a uniform and homogeneous deflocculated physical mixture of a first and second phosphor. The first phosphor has a desired emission in the spectral region from about 320 to about 400 nanometers and the second phosphor has a desired emission in the spectral region from about 280 to about 320 nanometers. The first phosphor has a first isoelectric point at a first pH and the second phosphor has a second isoelectric point at a second pH. The first and second pH form a pH range. The deflocculated coating is stabilized by deflocculating the mixture of phosphors at a third pH sufficiently outside of range to produce a resulting coating which consistently has the desired emission.

The preferred embodiment of the process of the present invention lies in maintaining the pH of the suntanning lamp suspension at a pH between 5.5 and 6.5. Lamps made under this control display excellent texture and proper UVB emission.

DETAILED DESCRIPTION

A new phosphor blend has recently been used by GTE to make sun tanning lamps. The phosphor mix contains 81% type 2052 phosphor, 16.5% type 2096 phosphor and 2.5% 2345 type phosphor. The 2052 material [Sr(F)B$_4$O$_7$:Eu], a strontium fluoro borate phosphor, emits in the UVA region. The 2096 [Ce(Sr)Al$_{11}$O$_{17}$:Ce] phosphor emits UVB radiation. A small amount of the 2345 phosphor, Y$_2$O$_3$:Eu, is added to achieve the desired color point. The phosphor mixture is suspended in a water base medium which contains a binder (Polyox), very fine aluminum oxide powder (Degussa Aluminum Oxide C), surfactants and defoamers.

Figure 1:
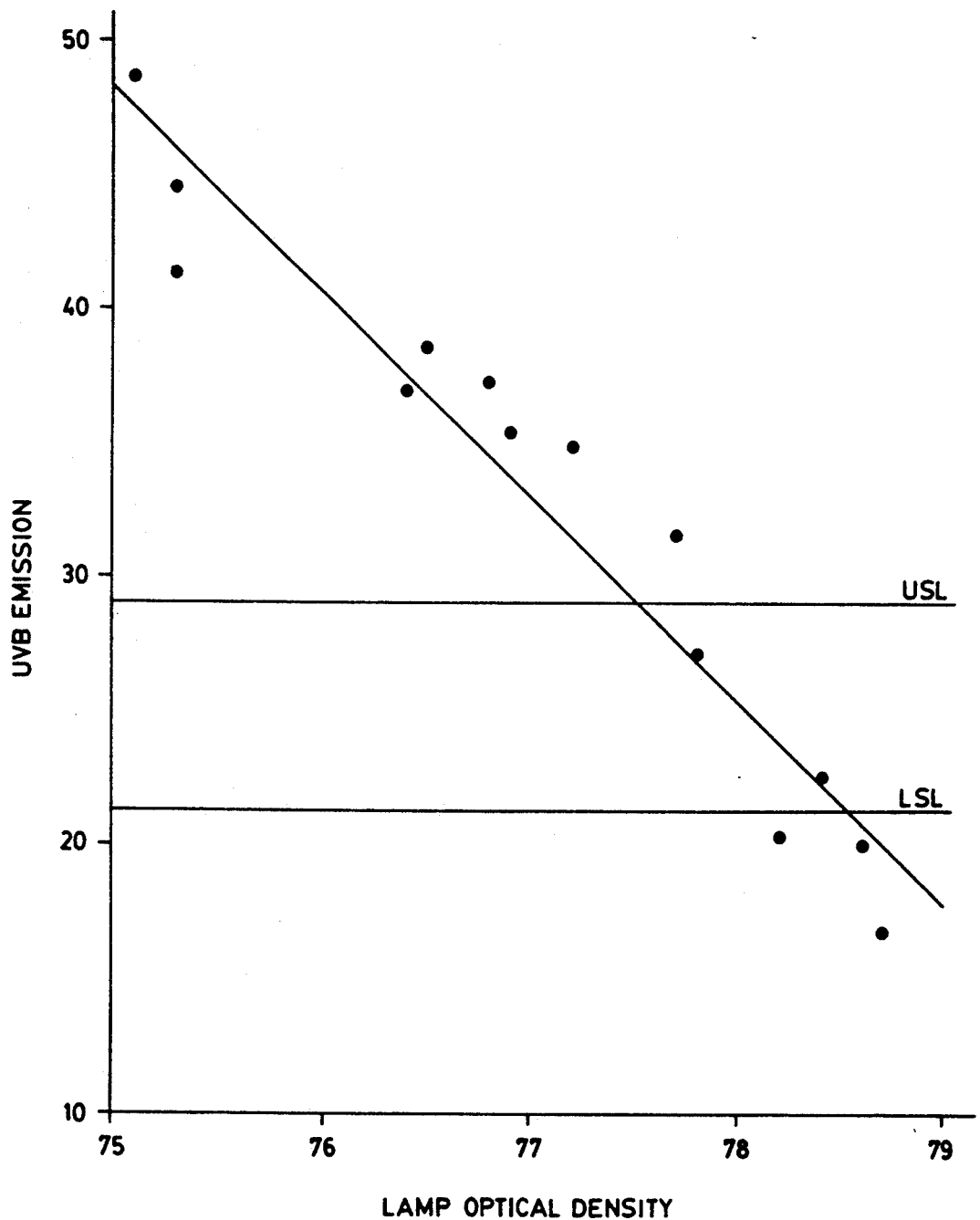
FIG. 1 shows the relationship between UVB emission and the optical density (OD) of lamps.

In the beginning, production of these lamps was problematic because of unacceptable coating quality and higher than normal UVB emission. The lamps suffered from separated coating texture and low values of OD. It is critical that these suntanning lamps produce an appropriate level of UVB emission. There is a relation, shown in FIG. 1, between UVB emission and the OD of these lamps. The UVB emission increases as the lamp OD decreases. Attention is drawn to the upper and lower acceptable limits, USL and LSL respectively, of UVB emission. It follows that only those lamps will be acceptable which have an OD between about 77.5 and 78.5.

Figure 2:
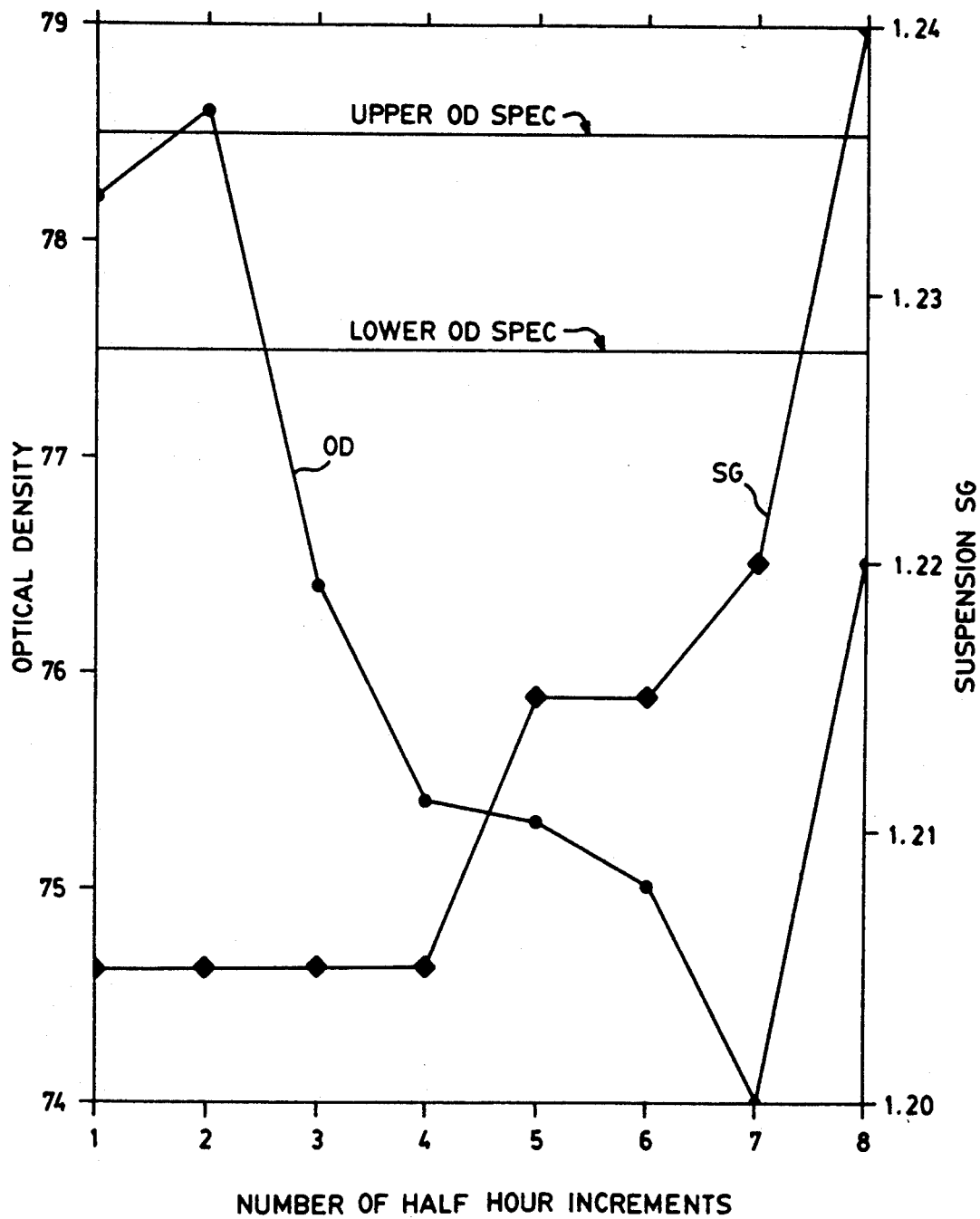
FIG. 2 shows production data on the variation in lamp OD and suspension SG with time for problem lamps.
Figure 3:
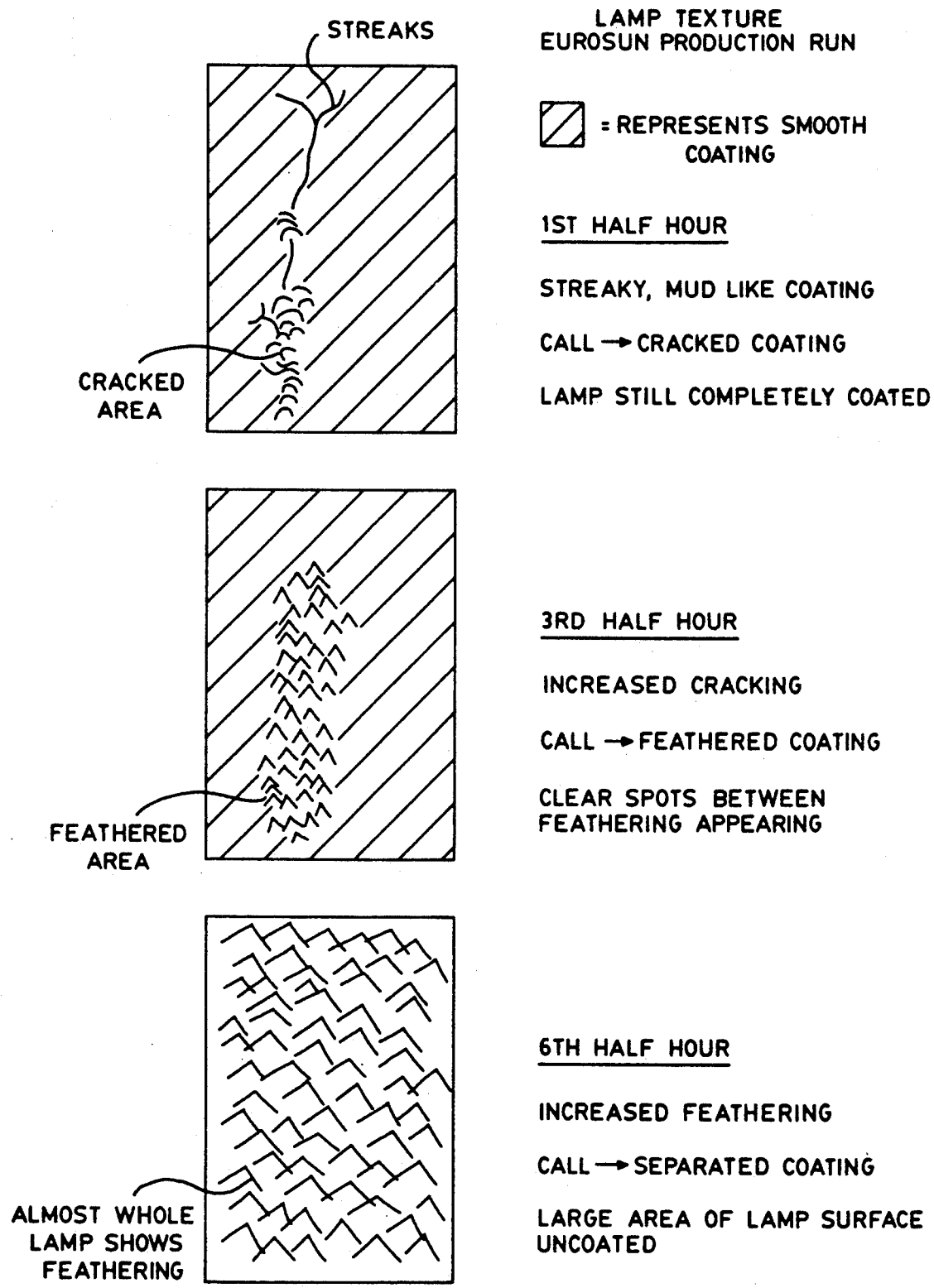
FIG. 3 shows the progress in finished lamp texture with time for problem lamps.

Production data from a typical initial unsuccessful run is shown in FIG. 2. It is observed that the OD of the finished lamps fell below the LSL one hour into the run. In fact, the OD was as low as 76.5 in about one and a half hours. The lamp texture and suspension properties were studied in order to understand the problem. FIG. 3 shows the progression in finished lamp texture with time. It is observed that a streaky, mud-like coating, referred to as a cracked coating, developed about a half hour into the run. The lamps were still completely coated and the glass surface could not be seen. After about one and a half hours, the area occupied by the cracked coating increased. This coating texture is referred to as a feathered coating. Clear spots on the glass could be seen between the feathered areas. In about three hours, almost all of the lamp area displayed feathered coating. Large portions of the lamp surface had no coating. This type of coating texture is referred to as a separated coating.

Feathered and separated coatings are often caused by flocculation of the phosphor particles. It was, therefore, hypothesized at this juncture that flocculation of the phosphor particles was a likely cause of the instability in the phosphor suspension.

FIG. 2 shows production data on the variation in lamp OD and suspension specific gravity (SG) with time. In an attempt to counteract the progressive drop in lamp optical density, operators continued to raise the specific gravity of the suspension by adding fresh stock of SG = 1.4. The increase in SG due to this addition is clearly seen in FIG. 2. This was not, however, capable of checking the drop in lamp OD. In the absence of flocculation, a rise in SG always results in an increase in lamp OD. The clearly opposite trends in suspension SG and lamp OD offers further credence to the hypothesis that phosphor flocculation is responsible for the instability of the suspension.

Figure 4:
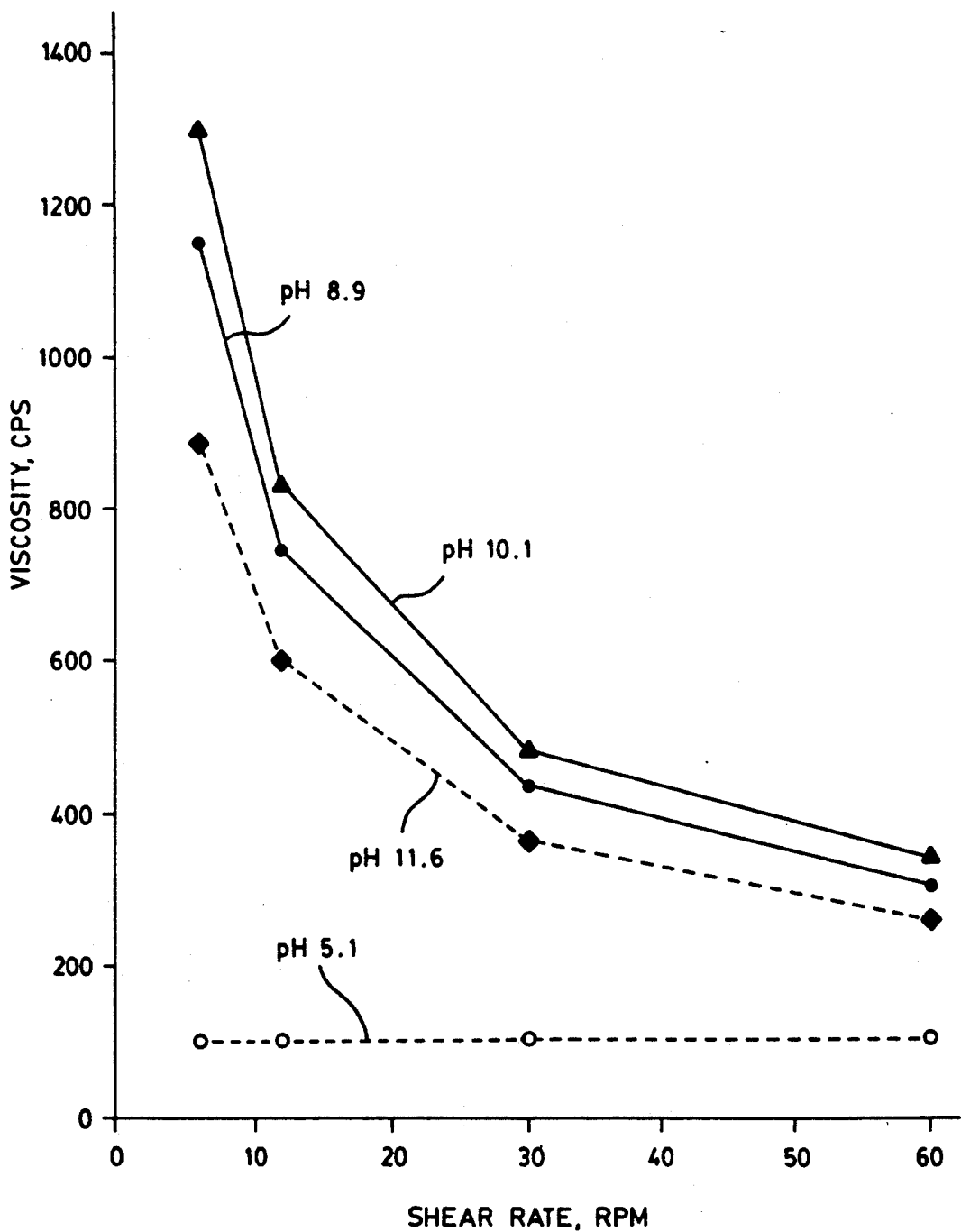
FIG. 4 shows the viscosity profiles of suspensions.

The rheology of the lamp suspension was also investigated. A fresh suspension of the blend was made up, and its rheological characteristics studied using a Brookfield rotational viscometer. The pH of the freshly made up suspension was 8.9. The viscosity profile is shown in FIG. 4. The suspension is clearly pseudoplastic: the viscosity decreases with increasing rate of shear (or rpm). A Newtonian system would have depicted a flat viscosity profile substantially unaffected by shear. The strong pseudoplastic rheology is a third independent indicator of phosphor flocculation.

The investigations into the lamp texture, suspension SG and suspension rheology led to the definite conclusion that the problem being encountered was due to phosphor flocculation.

Figure 5:
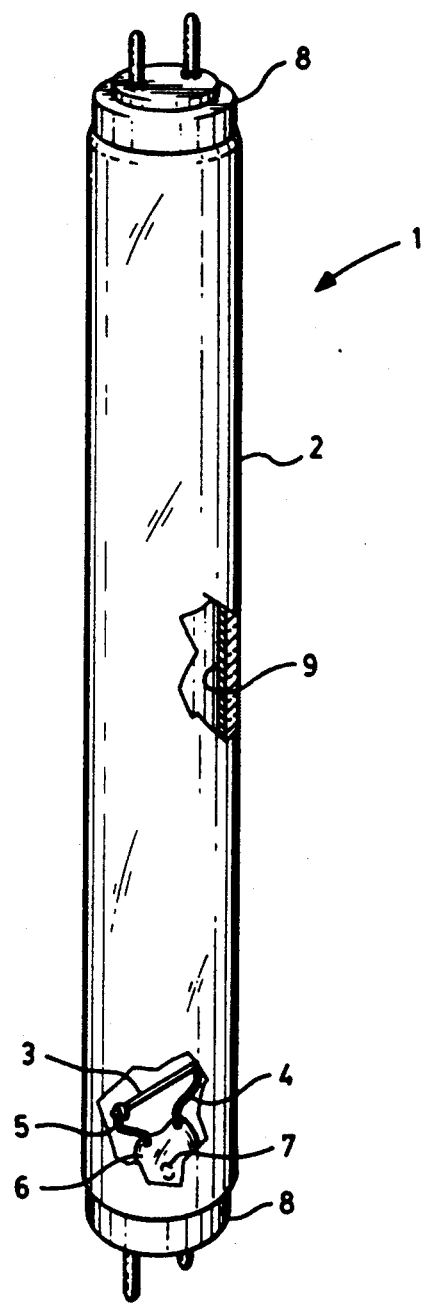
FIG. 5 is a perspective view partially broken away of a fluorescent lamp construction.

FIG. 5 is a perspective view partially broken away of a fluorescent lamp construction of the present invention. Referring to FIG. 5, there is shown a fluorescent lamp 1 comprising an elongated glass bulb 2 with circular cross section. The discharge assembly in the lamp is the usual electrode structure 3 at each end supported by inlead wires 4 and 5 which extend to a glass seal 6 in a stem mount 7 to the contacts of a base 8 affixed at opposite ends of the lamp. The discharge sustaining filling in the sealed glass tube is an inert gas such as argon or a mixture of argon and other gases at a low pressure in combination with a small quantity of mercury to provide the low vapor pressure manner of lamp operation. The inner surface of the glass evelope is provided with a single layer coating 9 directly adjacent the envelope. The coating is applied by contacting the envelope with an aqueous suspension of phosphor mixtures substantially along the full length of the bulb and around the bulb circumferential inner wall. After the wet coating is applied, it is dried and baked according to methods known in the art.

The physical mixture of phosphors comprise a first and second phosphor, with the first phosphor having a desired emission in the spectral region of from 320 to 400 nanometers and the second phosphor having a desired emission in the spectral region of from 280 to 320 nanometers. The first phosphor has a first isoelectric point at a first pH and said second phosphor has a second isoelectric point at a second pH. The first and second pH form a pH range. The phosphors are defloculated at a pH sufficiently outside of said range to produce a resulting coating which consistently has the desired emission. The preferred phosphor mix contains 81% type 2052 phosphor, 16.5% type 2096 phosphor with the small balance being a red emitting phosphor. The 2052 material [Sr(F)B$_4$O$_7$:Eu], a strontium fluoro borate phosphor, emits in the UVA region. The 2096 [Ce(Sr)Al$_{11}$O$_{17}$:Ce] phosphor emits UVB radiation.

The physical mixture of phosphors may include additional phosphors which have additional isoelectric points at respective, additional pH points. The additional pH points can be combined to form a range with the pH points of the other phosphors. The pH during deflocculation must be sufficiently outside of said range for stabilizing said deflocculated mixture. A small amount of GTE Type 2345 phosphor, Y$_2$O$_3$:Eu, is added to achieve the desired color point. The phosphor mixture is suspended in a water base medium which contains a binder (Polyox), very fine aluminum oxide powder (Degussa Aluminum Oxide C), surfactants and defoamers.

DISPERSION OF POWDERS IN LIQUIDS

Most inorganic materials develop a surface charge (or potential) when placed in water. The magnitude and polarity of the surface charge (or potential) depends on the nature of the solid surface and the composition of the liquid. The charging of a solid surface in a liquid may be due to several reasons:

a) unequal adsorption of ions from the liquid phase to the surface of the solid;

b) unequal transfer into solution of one type of ion over another from the crystal lattice;

c) ionization of surface groups of the solid;

d) trapping of immobile charge in the solid.

The ionization of surface groups is common in oxide surfaces. It is noted that all of the phosphors and the fine alumina in the suntanning suspension are essentially oxide surfaces. Oxide surfaces, in general, are characterized by amphoteric hydroxyl groups which can react with either H$^+$ or OH$^-$ depending on the pH of the fluid:

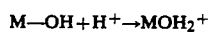

$$M-OH + H^+ \rightarrow MOH_2^+$$

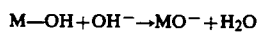

$$M-OH + OH^- \rightarrow MO^- + H_2O$$

Colloid science experts like Hunter, Duhkin and Deryaguin discuss the concept of "a surface of shear" around a solid particle in a liquid, as being an imaginary surface located close to the particle surface and enclosing a stagnant liquid. This surface of shear also encloses counterions and co-ions of the liquid within it. Counterions are ions, present in the liquid, with a charge opposite to that existing on the particle surface. Co-ions have a polarity identical to that on the particle surface. The region of the liquid in the neighborhood of the surface would be richer in counterions than in co-ions. This follows from the fact that a charged surface would repel ions of a similar charge. These ions exist beyond the surface of shear and stretch out into the bulk of the liquid. It follows from charge neutrality that the summation of the product of ionic concentrations and valence in the bulk of the liquid must be zero.

The surface of the solid together with the liquid in its neighborhood is referred to as the "double layer". In the double layer, the potential changes from a value equal to the surface potential to zero in the bulk of the liquid. The rate at which this potential drops off depends strongly on the ionic concentration of the liquid, a higher ionic concentration leading to a sharper rate of change of potential.

The net charge on the surface of shear is referred to as the electrokinetic charge. Furthermore, the average potential existing on this surface is called the zeta potential. The accepted reference for potential is zero potential existing in the bulk of the liquid. It follows, therefore, that a positively charged particle surface would have a positive zeta potential whereas a negatively charged surface would display a negative zeta potential. The sign and magnitude of the zeta potential reflect the sign and magnitude of the surface potential. The pH of the liquid where the zeta potential is zero is called the Isoelectric Point or IEP. The material is positively charged when the pH is lower than the IEP and it is negatively charged if the pH exceeds the IEP.

The stability of a dispersion is controlled by the attractive and repulsive forces existing between the individual particles. The attraction between particles results from the dispersion forces (London-van der Waals) while repulsion stems from the interaction of the electrical double layers which are present around each particle. The double layer repulsion effect is the repulsion force of significance in charge stabilized systems like the suntanning lamp suspension.

Flocculation can be of two types: intra-phosphor flocculation and inter-phosphor flocculation. The former refers to flocculation between particles of the same phosphor, while the latter refers to the flocculation between dissimilar phosphor particles. It follows from these definitions that a single component phosphor suspension can only display intra-phosphor flocculation, while a multicomponent phosphor suspension can exhibit one or both of these phenomena.

Intra-phosphor flocculation occurs if the absolute magnitude of the zeta potential of the material is too low, as would be the case when the pH is close to the IEP of the material. At this point, the repulsive force due to the double layer interaction is too low to counteract the van der Waals attractive forces. Inter-phosphor flocculation occurs when the pH is such that one of the components is negatively charged (pH higher than IEP for this material) while another component is positively charged (pH lower than IEP for this component). In other words, for inter-phosphor flocculation to occur say between two phosphors, the pH has to be between the IEPs of the two materials. The electrostatic attractive forces dominate in this case, leading to flocculation between the dissimilar phosphors. The probability of inter-phosphor flocculation is higher when the spread in the IEP for the various components is larger. As an example, if the IEP of phosphor A is 10 and that of phosphor B is 8, it follows that for a suspension pH between 8 and 10 that particles of A and B would be positively and negatively charged respectively. This would lead to flocculation.

Having established flocculation as being the cause of the problem with the manufacture of the suntanning lamp, and realizing the role of the zeta potential and IEP in flocculation, the next step was to measure these electrokinetic properties. An electroacoustic based apparatus from Matec Instruments, called the ESA apparatus, was used for this purpose. This instrument excites an aqueous suspension of particles by a high frequency electric field. The interaction between the double layer surrounding the particles and the alternating electric field leads to oscillation of the particles in the water. This creates a sound wave whose amplitude, also called the Electrokinetic Sonic Amplitude or ESA, is measured by the apparatus. The ESA is directly proportional to the dynamic mobility of the particles suspended in the liquid. The dynamic mobility in turn is proportional to the zeta potential of the material. It is, therefore, possible to track changes in zeta potential by monitoring changes in the ESA. In addition, the IEP may easily be determined since it is the pH where the ESA is zero. The ESA is negative when the pH exceeds the IEP and is positive when the pH is less than the IEP.

This paragraph describes the experimental procedure adopted in the measurement of IEP for each of the three phosphors of interest. A mass of 15 g of the phosphor is added to 200 cc distilled water in a Teflon sample cell. A Teflon magnetic stirrer bar is placed in the cell. Next the cell is positioned in the ESA apparatus and surrounded by a constant temperature water jacket. This maintains the contents of the sample cell, which is stirred by both the magnetic stirrer and an internal propeller mixer, at approximately 25° C. The cell contents are aged for a period of time, during which the ESA, suspension conductivity and pH are recorded at one minute intervals. The aging time period, determined by the time taken for the pH to stabilize, is usually between 18 and 24 hours. Once the pH has stabilized, the contents of the cell are titrated potentiometrically. In this particular case, the titrant is a base. The base is added under computer control to the contents of the sample cell. A typical base is sodium hydroxide, but ammonium hydroxide can also be used. The ESA decreases as the pH increases, becomes zero at the IEP and changes to a negative quantity when the pH increases beyond the IEP.

Figure 6:
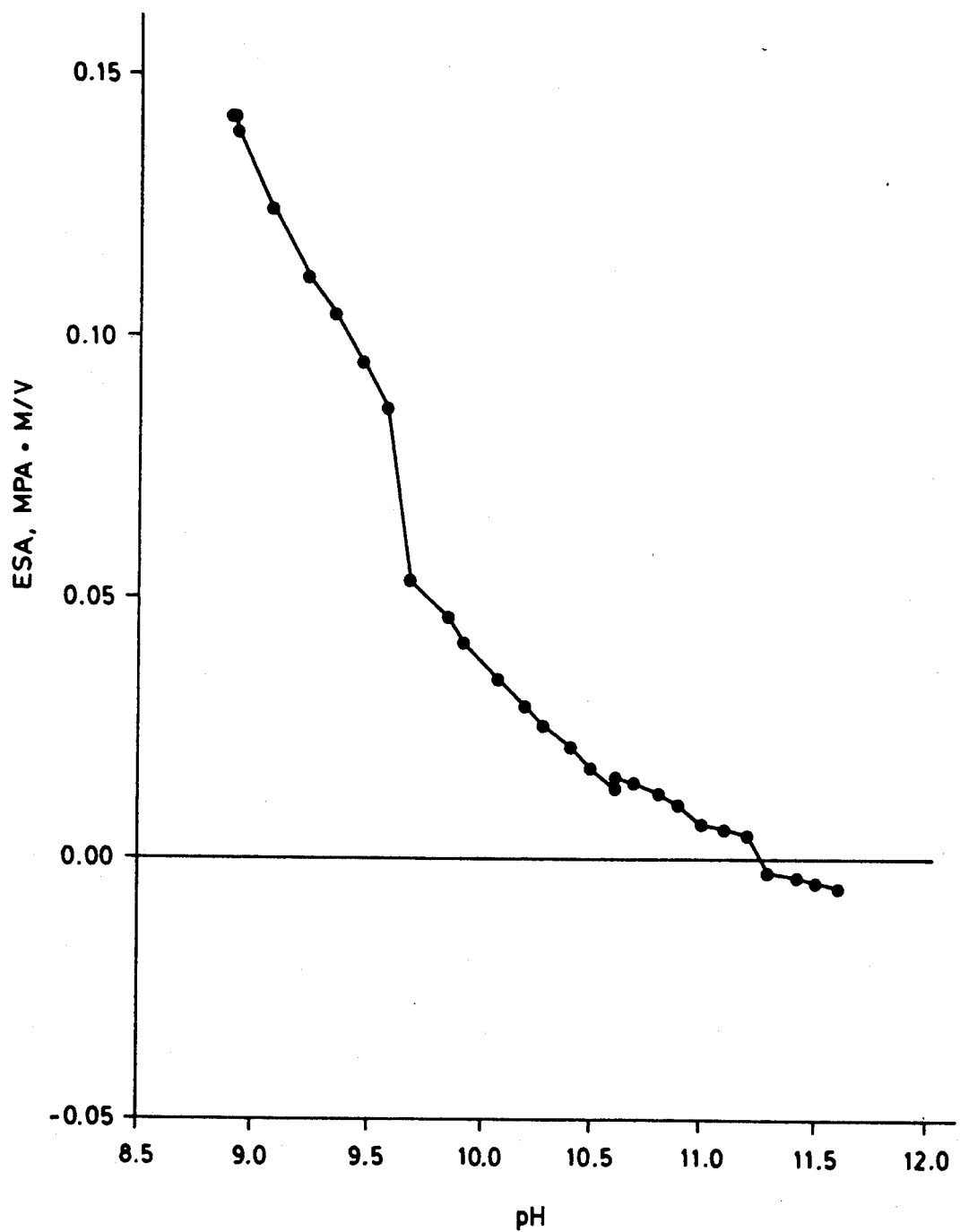
FIG. 6 shows the ESA vs pH characteristics of type 2052 phosphor.
Figure 7:
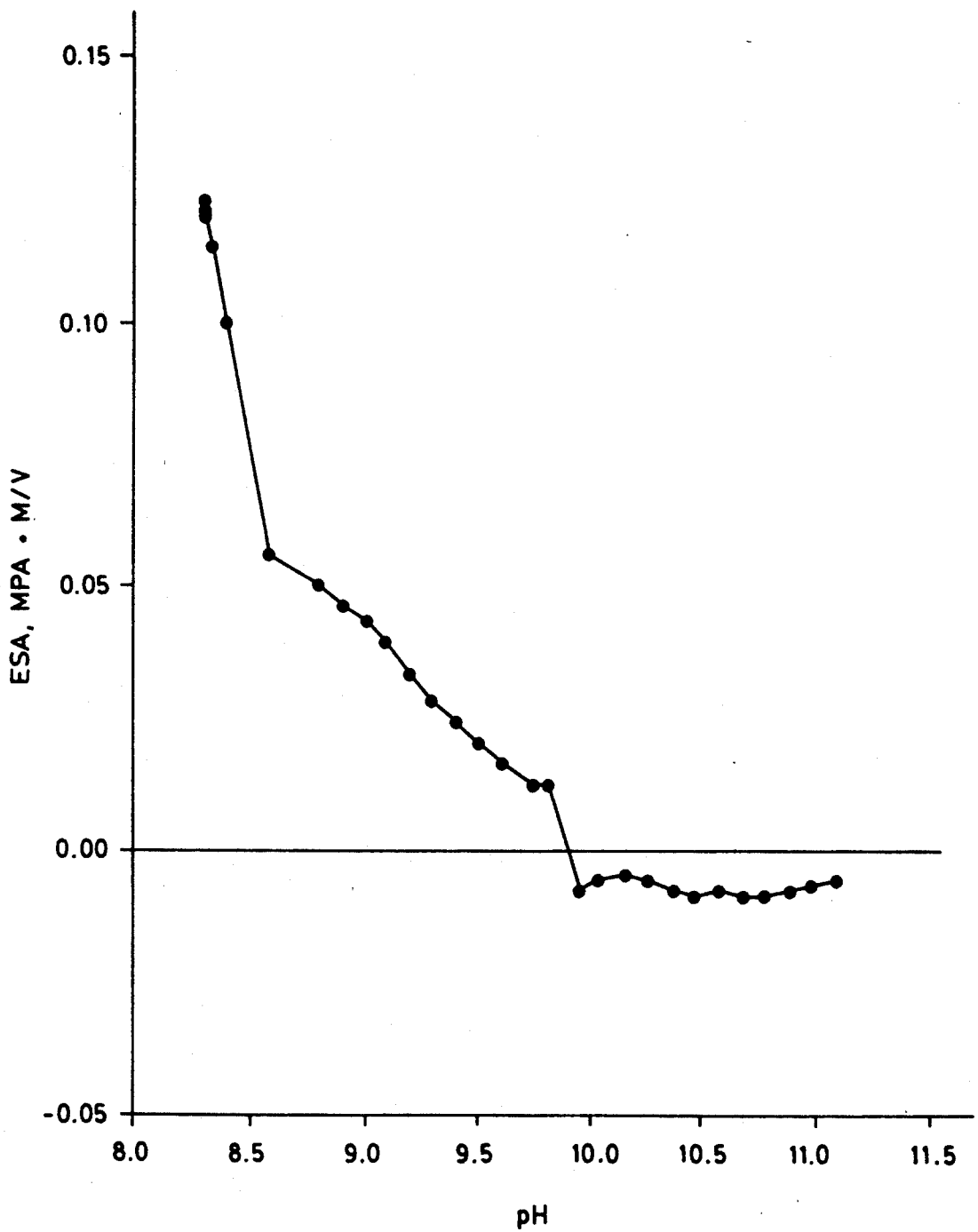
FIG. 7 shows the ESA vs pH characteristics of type 2096 phosphor.

The ESA vs pH characteristics of type 2052 phosphor is shown in FIG. 6. The IEP for this strontium borate material is about 11.2. It is clear, from the large magnitude of the IEP, that this phosphor is a very basic material. In addition, the magnitude of the ESA does not increase rapidly for a range of pH on either side of the IEP. In particular, the rate of change of ESA between pH of about 10.7 to 11.7, is small compared to that for pH values less than about 0.5. This indicates that the potential for intra-phosphor flocculation for this phosphor is high in a pH range between 0.7 and 11.7, but may be avoided by going to a pH lower than about 10.5. The ESA vs pH characteristics of type 2096 phosphor is shown in FIG. 7. The IEP for this cerium strontium aluminate material is about 9.9. While this phosphor is basic, the basicity is much lower than that for the phosphor type 2052. It is also observed that the rate of change of ESA in the vicinity of the IEP is not symmetrical. In particular, the magnitude of the change in ESA with pH, in the vicinity of the IEP, is much larger when the pH is lower than the IEP (between pH of 8.6 and 9.6 for example) as compared to that when the pH exceeds the IEP (between pH of 10 and 11 for example). It follows that intra-phosphor flocculation for this phosphor is best avoided by maintaining a pH which is lower than the IEP and suitably distanced from it.

Figure 8:
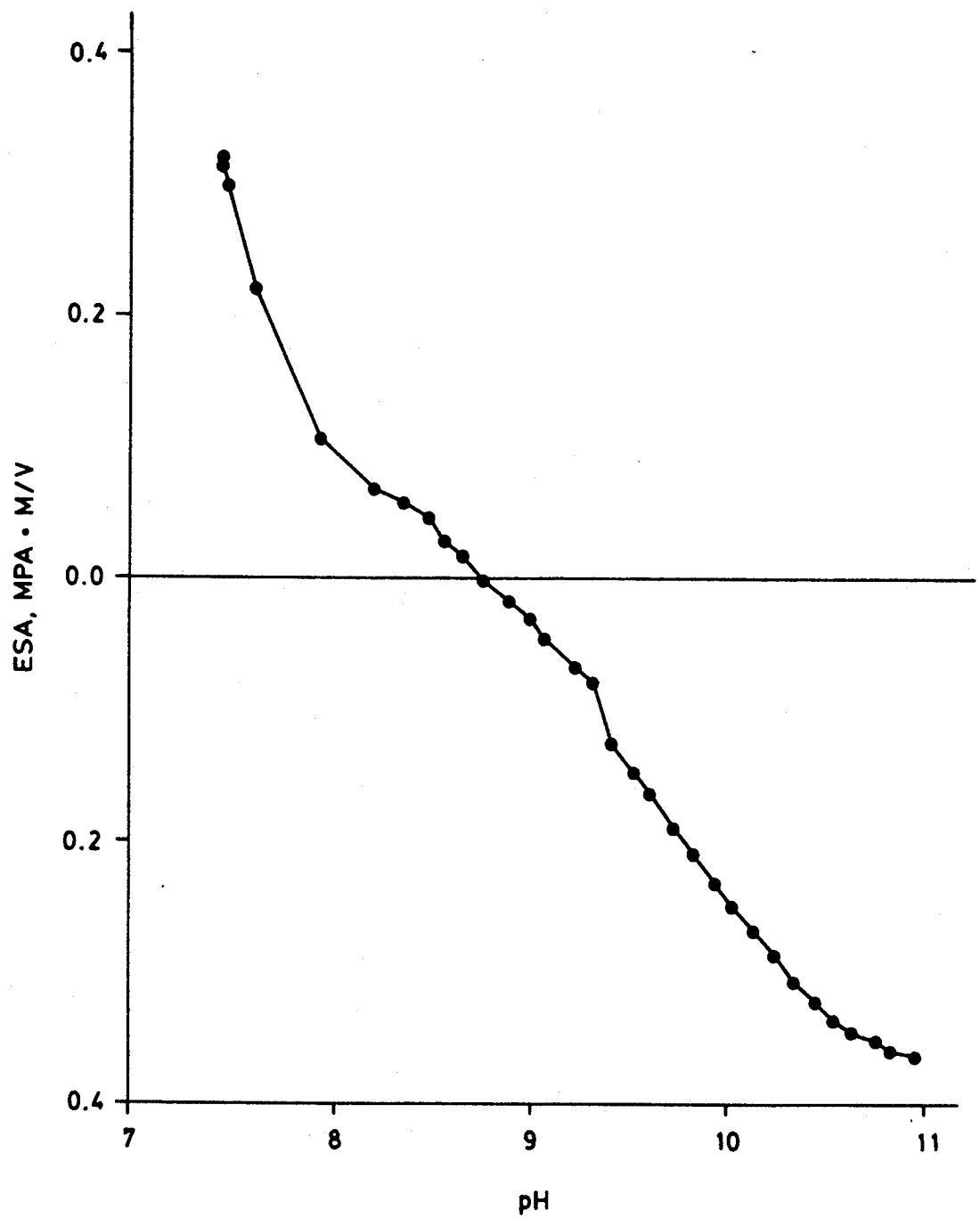
FIG. 8 shows the ESA vs pH characteristics of type 2345 phosphor.

The ESA vs pH characteristics of the minor component phosphor type 2345 is shown in FIG. 8. The IEP for this yttrium oxide phosphor is about 8.8. Unlike the other two phosphors, this material does not exhibit a marked difference in electrokinetic behavior when the pH is changed from a range which includes values lower than the IEP to one which includes pH values which exceed the IEP.

The fourth solid component in the suntanning lamp suspension is finely divided aluminum oxide, marketed as Aluminum Oxide C by Degussa. The manufacturer reports an IEP of 9.0 for this material. At this juncture the IEP of all four inorganic solids in suspension have been determined. They range from 8.8 for type 2345 phosphor, 9.0 for the alumina, 9.9 for type 2096 phosphor to 11.2 for type 2052 phosphor.

It follows from this information and the discussion of flocculation in an earlier section that if the suspension pH is anywhere between 8.8 and 11.2, then flocculation will result. Intra-phosphor flocculation will occur when the pH is close to any one of the IEP values. In addition, inter-phosphor flocculation will occur when the pH is such that at least two materials are charged oppositely. Consider, for example, a pH of 8.9: at this pH, the 2096 and 2052 type phosphors will be strongly positively charged while the 2345 type phosphor will be negatively charged, though weakly. This will lead to inter-material flocculation between these materials. In addition, at this pH the alumina and the 2345 type phosphors will experience intra-material flocculation because this pH is very close to their respective IEP values. Thus the IEP information predicts flocculation of the suspension, due to one or both mechanisms, at this pH. Flocculation will lead to a pseudoplastic rheology. Pseudoplasticity refers to the decrease in suspension viscosity with increasing rate of shear. This has been verified by a Brookfield viscometer study and is shown as the second curve from the top in FIG. 4.

If the pH of the freshly made up lamp suspension is increased to 10.1, by the addition of ammonium hydroxide for example, the pseudoplasticity of the suspension increases relative to that at pH 8.9. The suspension viscosity at pH 10.1 changes more rapidly with shear than that at pH 8.9. This is clearly evident when one compares the uppermost curve in FIG. 4 with the curve just below it. The increase in pseudoplasticity is due to the fact that at this pH of 10.1, there is significant inter-phosphor flocculation between the two major components of the suspension, viz., the phosphors 2052 and 2096. The former constitutes 81% by weight of the solids while the latter makes up 16.5% of the solids mass. The former is positively charged at this pH while the latter is negatively charged, leading to inter-phosphor flocculation. This phenomenon also occurs at this pH between phosphors 2052 and 2345, though of a lesser magnitude because of the small concentration of the 2345 type phosphor.

If the pH of the freshly made up suspension is increased still further to 11.6, by the addition of tetramethyl ammonium hydroxide or diethyl amine or mooethanol amine for example, the pseudoplasticity of the suspension decreases significantly. This is observed in the third curve from the top in FIG. 4, where it is seen that the dependence of viscosity on shear has lessened. The decrease in pseudoplasticity is due to the fact that at this pH, all the three phosphors have the same polarity, viz., negative because this pH exceeds the IEP of all three phosphors. This leads to electrostatic repulsion between the different phosphors thus stabilizing against inter-phosphor flocculation. It has been stated, however, with respect to FIG. 6 that the ESA for type 2052 phosphor does not increase rapidly with pH, for pH values exceeding the IEP but in its vicinity. It is to be expected, therefore, that at this pH, the magnitude of the negative zeta potential on the surface of the 2052 type phosphor particles is not sufficiently large to stabilize against some degree of intra-phosphor flocculation. It is this which leads to the lower observed degree of pseudoplasticity.

It follows from the above discussion that if a still higher pH were used, around 12.5 or higher, such that not only did all the phosphors still maintain the negative polarity they had at pH of 11.7, but that the mass dominant 2052 type phosphor particles also did not experience intra-phosphor flocculation, then the flocculation problem with the suntanning lamp suspension problem would be solved. There are, however, serious production concerns associated with the use of the chemicals needed to achieve such high values of pH. In particular, adequate safety precautions are needed to avoid caustic burns and/or flammable mixtures.

The other solution to the problem is to go to a low pH such that all the phosphors now have a positive charge to stabilize against inter-phosphor flocculation, the pH also being low enough to produce adequate positive charge on the particles to stabilize against intra-phosphor flocculation. It follows from the IEP information that this pH must be lower than the lowest IEP of the three phosphors and sufficiently removed from it.

Figure 9:
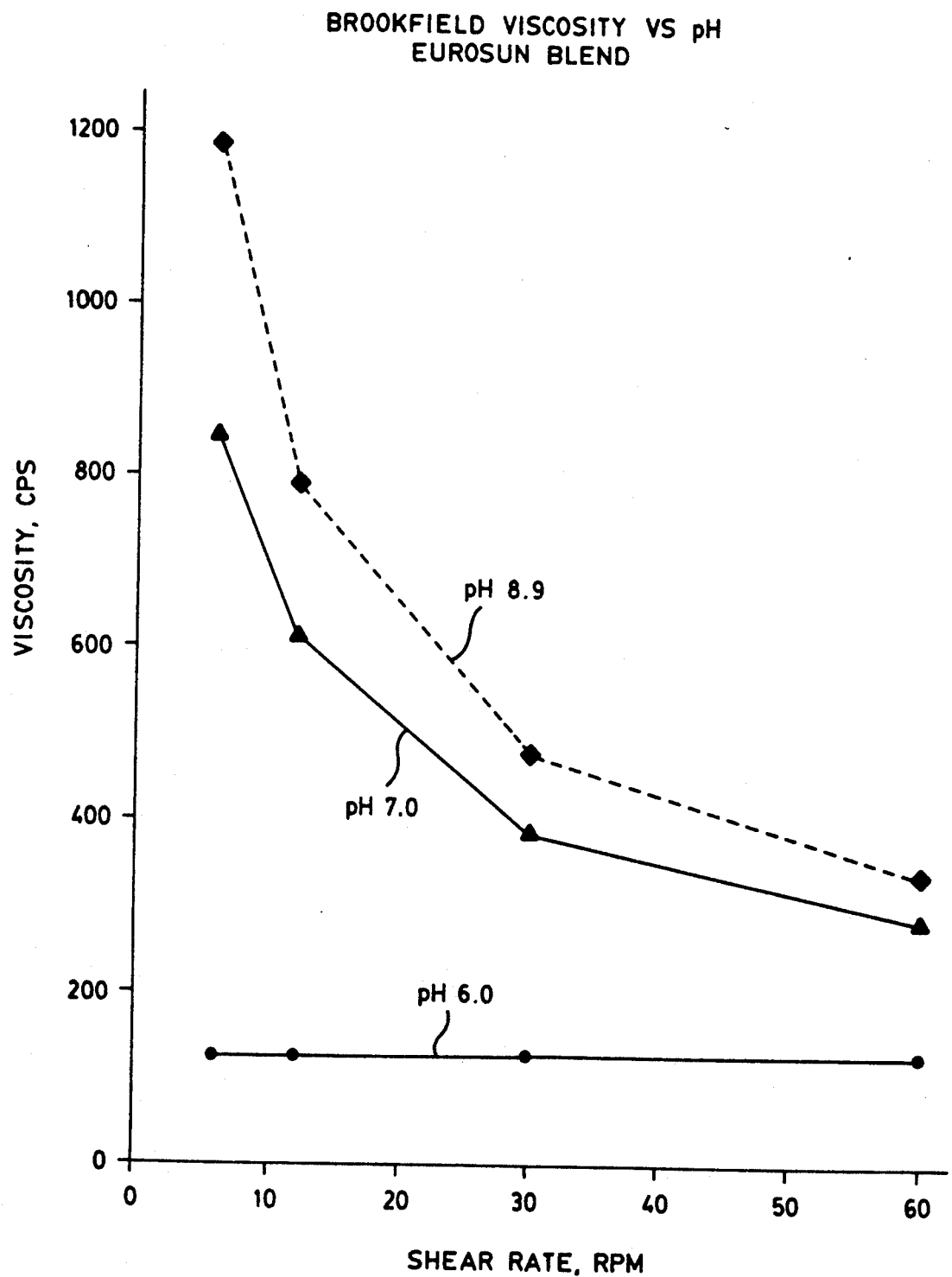
FIG. 9 shows the viscosity as a function of shear rate at pH values of 8.9, 7 and 6.

A suitable pH operating range was determined by testing the rheology of the suspension at various pH values. FIG. 9 shows the viscosity as a function of shear rate at pH values of 8.9, 7 and 6. It is very clear that flocculation begins somewhere between pH of about 6.5 and higher. There is no indication of any pseudoplasticity at a pH of 6.0. The viscosity profile is perfectly Newtonian proving the absence of any flocculation.

Figure 10:
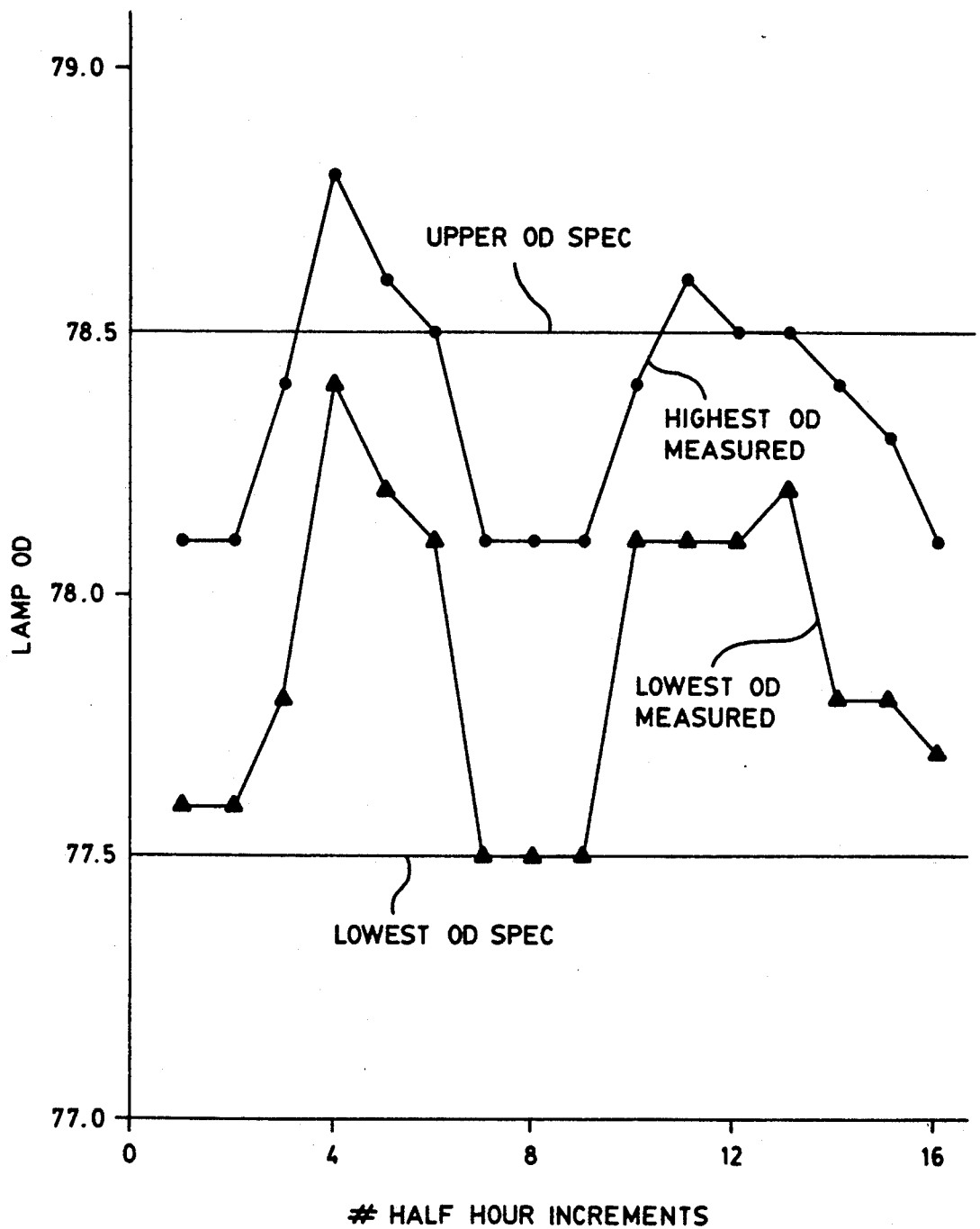
FIG. 10 shows lamp optical density vs time of lamps made in accordance with the present invention.

It was decided, based on this work, that a range of pH from 5.5 to 6.5 is adequate for purposes of elimination of flocculation in suntanning lamp suspensions. A run of over 100,000 lamps was made. All the lamps had very smooth texture, good density and proper UVB output characteristics. FIG. 10 shows the maximum and minimum lamp optical density readings measured at every half hour of the run. It has been stated earlier that the unacceptably high values of UVB emission in the early production runs were due to very low values of the lamp OD. It is clear from FIG. 10 that this problem has been solved: the lowest optical densities fall well within the specifications. This proves that the UVB emission from these lamps are within specifications.

What is claimed is:

1. A method of making a skin tanning fluorescent lamp having a coating comprising a first phosphor having a first emission in the spectral region from about 320 to 400 nanometers and a second phosphor having a second emission in the spectral region from about 280 to 320 nanometers comprising the steps of preparing an aqueous suspension comprising a uniform and homogeneous deflocculated physical mixture of a first and second phosphor, said first phosphor having a emission in the spectral region from about 320 to 400 nanometers and said second phosphor having a emission in the spectral region from about 280 to 320 nanometers, said first phosphor having a first isoelectric point at a first pH and said second phosphor having a second isoelectric point at a second pH, said first pH and said second pH forming a pH range, forming an aqueous suspension of said first and said second phosphors, and deflocculating said first and second phosphors at a third pH sufficiently outside of said pH range for forming a stabilized and deflocculated suspension of said first and said second phosphors, and coating a tubular glass envelope with said stabilized and deflocculated suspension.

2. A method of making a skin tanning fluorescent lamp according to claim 1 wherein said third pH is sufficiently lower than said range for forming a stabilized and deflocculated suspension of said first and said second phosphors.

3. A method of making a skin tanning fluorescent lamp according to claim 2 wherein said aqueous suspension of phosphors comprises additional phosphors, said additional phosphors having additional isoelectric points at respective, additional pH points, said additional pH points forming said pH range with said first pH and said second pH, said third pH being sufficiently lower than said pH range for forming a stabilized and deflocculated suspension of said first phosphor, said second phosphor, and said additional phosphors.

4. A method of making a skin tanning fluorescent lamp according to claim 3 wherein said first phosphor consists essentially of a strontium borate present in an amount sufficient to obtain a first emission in the spectral region from about 320 to about 400 nanometers and said second phosphor consists essentially of a cerium strontium aluminate present in an amount sufficient to obtain a second emission in the spectral region from about 280 to about 320 nanometers.

5. A method of making a skin tanning fluorescent lamp according to claim 3 wherein said aqueous suspension additionally comprises fines aluminum oxide particles.

6. A method of making a skin tanning fluorescent lamp according to claim 3 wherein said aqueous suspension additionally comprises a red emitting phosphor.

7. A method of making a skin tanning fluorescent lamp according to claim 3 wherein said first phosphor, said second phosphor, and said additional phosphors comprise solids in said aqueous suspension, and said first phosphor is present in an amount from about 75 to about 85 percent of the total weight of solids in said aqueous suspension.

8. A method of making a skin tanning fluorescent lamp according to claim 3 wherein said first phosphor, said second phosphor, and said additional phosphors comprise solids in said aqueous suspension, and second phosphor is present in an amount from about 10 to about 20 percent of the total weight of solids in said aqueous suspension.

9. A method of making a skin tanning fluorescent lamp according to claim 3 wherein said coating is applied as a single layer to said lamp.

10. A method of making a skin tanning fluorescent lamp according to claim 3 wherein said third pH is less than about 7.

11. A method of making a skin tanning fluorescent lamp according to claim 10 wherein said third pH is between 5.5 and 6.5.

12. A method of making a skin tanning fluorescent lamp according to claim 11 comprising adding an organic acid to said aqueous suspension for adjusting said third pH outside of said pH range.

13. A method of making a skin tanning fluorescent lamp according to claim 12 wherein said organic acid is dilute acetic acid.

14. A method of making a skin tanning fluorescent lamp according to claim 3 wherein said additional phosphors comprises an europium doped yttrium oxide phosphor.

15. A method of making a skin tanning fluorescent lamp according to claim 14 wherein said europium doped yttrium oxide phosphor comprises a protective coating.

* * * * *